Figure 1:
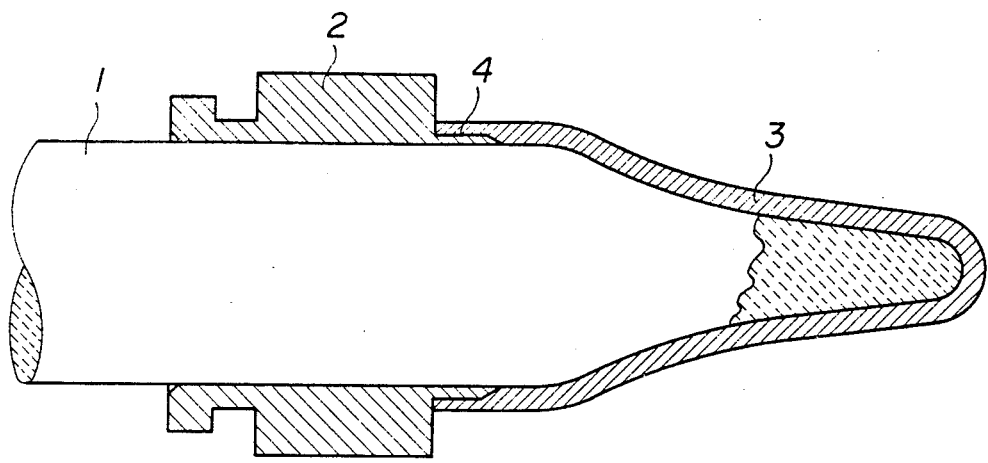

United States Patent [19]

Pecci

[11] Patent Number: 4,541,474
[45] Date of Patent: Sep. 17, 1985

[54] PROCESS FOR MANUFACTURING A MOULDING PLUNGER FOR HOLLOW GLASS OBJECTS

[75] Inventor: Michel Pecci, Cachan, France

[73] Assignee: Castolin S.A., Saint-Sulpice, Switzerland

[21] Appl. No.: 582,878

[22] PCT Filed: Dec. 22, 1980

[86] PCT No.: PCT/CH80/00160
§ 371 Date: Aug. 12, 1981
§ 102(e) Date: Aug. 12, 1981

[87] PCT Pub. No.: WO81/01841
PCT Pub. Date: Jul. 9, 1981

Related U.S. Application Data

[63] Continuation of Ser. No. 293,205, Aug. 12, 1981, abandoned.

[30] Foreign Application Priority Data

Dec. 21, 1979 [FR] France ............... 79 31546

[51] Int. Cl.⁴ .............. B22D 23/00; B22D 19/04
[52] U.S. Cl. .................... 164/46; 164/76.1; 164/98
[58] Field of Search ............. 164/99–102; 228/261, 902; 219/121 PL, 76.16; 427/423

[56] References Cited

U.S. PATENT DOCUMENTS

| 2,241,996 | 5/1941 | Ingham | 164/19 X |
| 2,449,136 | 9/1948 | Pattison | 164/20 |
| 2,945,273 | 7/1960 | Herzmark et al. | 164/24 |
| 2,966,423 | 12/1960 | Shichman | 164/46 |
| 3,112,540 | 12/1963 | Kaneko et al. | 164/112 X |
| 3,204,917 | 9/1965 | Richards | 164/24 |
| 3,921,701 | 11/1975 | Cardone | 164/46 |

FOREIGN PATENT DOCUMENTS 1280494 10/1968 Fed. Rep. of Germany ........ 164/46

Primary Examiner—Kuang Y. Lin
Attorney, Agent, or Firm—Hopgood, Calimafde, Kalil, Blaustein & Judlowe

[57] ABSTRACT

A method is provided for producing a composite moulding plunger, the plunger including a flanged base mounting for the plunger, the flange having a reduced coaxially extending annular portion to which is adherently bonded a hollow conical plunger formed of flame sprayed material, the conical plunger extending from the base mounting and terminating into a rounded end or peak, the plunger having a wall thickness ranging from about 0.5 to 10 mm. The hollow plunger is preferably formed of a flame sprayed nickel-base alloy selected from the group consisting of Ni-Si-B, Ni-Cr-Si-B and Ni-Cr and a copper alloy.

11 Claims, 2 Drawing Figures

PROCESS FOR MANUFACTURING A MOULDING PLUNGER FOR HOLLOW GLASS OBJECTS

This application is a continuation of application Ser. No. 293,205, filed Aug. 12, 1981, now abandoned.

The present invention relates to a process for manufacturing a moulding plunger for hollow glass objects.

In the hollow glass industry, moulding plungers are used which are formed by a hollow body having a rounded form at its conical end, the internal cavity of these plungers being intended for permitting the cooling thereof by means of a fluid. in order to manufacture objects, such as bottles, at a very high rate, by means of automatic machines.

Such plungers have to have a wall which is as thin as possible, in order to impose on them a high value of the thermal transmission coefficient, permitting a high cooling efficiency, while having a mechanical resistance which is sufficient to withstand the stresses to which they are subjected while they are being used.

Hitherto, as moulding punches for glass objects, hollow bodies have been used, which are formed by a support element of a ferrous metal, for example, of steel or cast iron, especially grey cast iron, of which those parts of the external surface particularly exposed to mechanical wear and to the effects of corrosion at high temperature resulting from contact with the molten glass, are covered with a protective layer of a suitable material, for example, of certain metallic alloys, mixtures of metal and ceramics or even of ceramic materials.

In such plungers, it is not possible to decrease the thickness of the wall of the support element to below a certain limit, which is higher than that which would correspond to the limit of mechanical resistance because, for very small wall thicknesses, the lack of homogeneity as regards the structure of the ferrous material of the support element and also its moderate resistance to the thermal stresses would cause disturbances in respect of the protective surface layer.

One process is known for the manufacture of hollow bodies having a thin wall, constituting a self-supporting structure, which consists in forming a layer of material (this formation being generally effected by projecting a powder or a suspension of powder in a liquid) on a support coated with an intermediate layer of a substance which is soluble or fusible under conditions in which the external layer, intended to form the wall of the hollow body, is not subjected to any modification, and in then detaching this external layer from the support after dissolving or melting the substance which forms the intermediate layer. However, this process has the disadvantage that, for obtaining bodies which have a certain mechanical resistance, it is necessary to carry out a heat-densifying treatment of the external layer formed on the support. Now it is only possible for this treatment to be carried out when this layer is still on the said support, and this implies that it is necessary, first of all, to separate this layer from the support and to transport the "green body" as thus formed by this layer into a densifying device (for example, a sintering furnace), and this represents a delicate and expensive operation.

The object of the invention is to overcome the disadvantages which have just been mentioned, by making it possible to obtain a moulding plunger formed by a hollow body with a thin wall, but having an appreciable mechanical resistance.

To this end, the process according to the invention has the features which are set out in claims.

Figure 2:
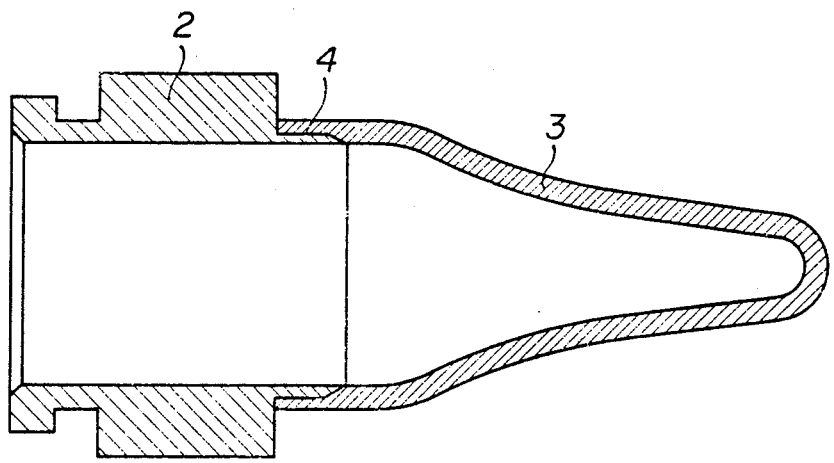

The invention will be better understood by reference to the following detailed description as regards how the process according to the invention is carried into effect, and by reference to the accompanying drawings, in which:

FIG. 1 is a partial section of the assembly, which is formed by a support member, a member serving as a base for the plunger and a compact layer of material formed by heat projection, and FIG. 2 is a sectional view of the moulding plunger, after mutual separation of the support member and of the layer of material formed by heat projection.

The first step in the process consists in forming, by heat projection, e.g., a thermal spray torch, a compact layer 3 of material on the end of a support element 1 and on the adjacent part 4 of an element 2, which is for example in the form of a flanged sleeve and is intended to serve as a base for the plunger, in such a manner that a part of the layer of material 3 adheres to the surface of an annular extending part 4 of the element 2 and remains integral with the latter after the separation of the releasably adhering material layer 3 from the support element 1. In this way, the assembly as shown in FIG. 1 is obtained.

The second step consists in separating the support element 1 from the layer of material 3, while maintaining the integral nature, firstly, of the assembly formed by this layer and the element 2, which serves as a base for the plunger and, secondly, of the support element 1, which may be used again for the manufacture of other plungers. As a consequence, the moulding plunger as shown in FIG. 2 is obtained.

It thus becomes possible for a moulding plunger to be obtained in a simple and economic manner, which plunger is composed of a composite element, of which the base portion is formed by a solid flanged part 2, intended to be subjected to relatively low thermal stresses, which base part being able to consist of an inexpensive material, such as grey cast iron, while only that thin-walled part 3 of the front portion of this plunger, intended to be subjected to high thermal stresses, is manufactured by heat projection.

The material which has the property of preventing the adhesion of the projected layer to the support element is preferably graphite or a ceramic material, such material being referred to as a release agent.

For example, the support element may be formed by at least one graphite part or a part of at least one ceramic material. The support element may also comprise at least one metallic part, the surface of which is covered by a layer of material, selected from graphite and the refractory metallic oxides.

The support element may also comprise at least one metallic part, of which the surface portion is oxidised so as to form a metallic oxide layer. The support element may also comprise at least one metallic part, of which the surface has undergone a treatment permitting it to have imposed thereon the property of preventing the adhesion to this surface of the layer of material formed by thermal projection.

If necessary, this layer is subjected to a densifying heat treatment prior to the separation from the support element. This densifying treatment may, for example, be a sintering, a sintering with formation of liquid phase or a fusing operation.

The layer of material formed by thermal projection may, for example, be formed by a metallic alloy, especially a self-cleaning alloy, and more particularly an alloy which is based on the elements Ni, B and Si or the elements Ni, Cr, B and Si. In the event of such an alloy being used, it is preferable to carry out a heat-densifying treatment before separating the layer from the support element. The layer of material formed by heat projection may also be formed by a metallic alloy which is based on the elements Ni and Cr or based on copper and, in this case, it is possible directly to obtain a layer having a sufficient density without a heat-densifying treatment. The layer of material formed by heat projection may also be formed by a mixture of at least one metallic material and at least one ceramic material, for example, by a material of the type which is known under the name of "Cermet" or even a material selected from the oxides, nitrides, carbides, silicides and borides.

The thermal projection of the material intended for forming the compact layer of material 3 can be effected, in any suitable i.e., flame spraying, for example, by using an oxy-acetylene or oxy-hydrogen flame-projection torch, or even a plasma blow-pipe, an electric arc torch, etc., the said material being used in the form of a powder, wire, etc.

Advantageously, during this projection, the substrate (i.e. the assembly formed by the support element 1 and the element 2 intended to serve as a base for the plunger) on to which is projected the material intended to form the layer of compact material is set in rotation in relation to the torch nozzle or or projection blowpipe. In this case, the said nozzle may advantageously be given a translatory movement parallel to the axis of rotation of the support, according to the advance of the projection, while being maintained at a constant distance from the substrate surface.

The layer of material formed by heat projection on the support element is preferably given a thickness such that the final thickness of the wall 3 of the front portion of the plunger is between 0.5 and 10 millimeters and, preferably, at most equal to 3 millimeters.

In the case where the layer deposited by heat projection is subjected to a thermal densifying treatment before it is separated from the support element, it is possible, for example, to carry out this heat treatment by using a gas burner or an oxy-acetylene torch, or any other means for producing a flame having the temperature which is required for the heat treatment. In this case, it is preferred to proceed in the manner similar to the thermal projection operation as previously described, that is to say, by causing the substrate bearing the layer to be densified to turn about its longitudinal axis in the flame, if necessary imparting to the nozzle of the burner or torch a translatory movement which is parallel to the axis of rotation of the support. It is also possible to use any other suitable heating means, for example, an induction-heating means (such a means being particularly relevant in the case where the support bearing the layer formed by heat projection is graphite) or a furnace.

If necessary, the surface of the layer formed on the support can be subjected to a machining or polishing operation prior to being separated from the support.

EXAMPLES

For the manufacture of plungers intended for the moulding of bottles, using the "pressing-and-blowing" process, this moulding being effected, for example, on a machine of the Hartford type, the procedure is that which has been described above, using thermal projection of a material on to a substrate formed of a support element 1 (FIG. 1), comprising an end portion of conical form which is elongated and rounded at its end or peak, extending a cylindrical body, and a part 2 (FIG. 1) in the form of a sleeve surrounding a part of the cylindrical body of the support element 1, to the rear of the end portion of this latter. Only the part 4 (FIG. 1) of the element 2 adjacent to the end of the support element 1 is subjected to this projection. During the projection, the assembly of this substrate is set in rotation about its longitudinal axis, placed in a vertical position, while imposing on the projection nozzle, depending on the advance of the projection, a translatory movement parallel to the axis of rotation of the support and while maintaining it at a constant distance from the surface of the support.

The details of the materials which are used and the operational conditions, as well as the results which are obtained, are indicated in the following table:

| No. of example | 1 | 2 | 3 | 4 |
| --- | --- | --- | --- | --- |
| Nature of the support: | Hollow monobloc member made of graphite, having an axially cylindrical conical form, rounded at its end | Hollow element of alumina having an axially cylindrical conical form, rounded at its end | Hollow cast-iron element, having an axially cylindrical conical form, rounded at its end, covered with a layer of graphite | Hollow steel element, having an axially cylindrical conical form, rounded at its end, covered with a layer of alumina |
| Dimensions of the support: base diameter (mm): length (mm): | 15 100 | 40 180 | 10 150 | 60 220 |
| Means used for effecting the heat | Plasma blow-pipe | Oxy-acetylene torch | Oxy-acetylene torch | Electric arc torch |

-continued

| No. of example | 1 | 2 | 3 | 4 |
|---|---|---|---|---|
| projection: Form in which the heat-projection means is supplied with material to be projected: | Powder | Wire | Powder | Wire |
| Projected material: | Si 3% B 2.5% Ni 94.5% (parts by weight) | Alloy having 90% Cu and 10% Al (by weight) | Alloy 85% Ni 10% Cr 2% B and 3% Si (by weight) | Alloy with 80% Ni and 20% Cr (by weight) |

As will be noted from the table, the projected material may be selected from the group consisting of copper-base and nickel-base alloys, the nickel-base alloys being Ni-Si-B, Ni-Cr-Si-B, and Ni-Cr, and the copper-base alloy being Cu-Al.

| Rate of flow of projected material (kg/h): | 2 to 3 | about 4 | 4 to 6 | about 7 |
|---|---|---|---|---|
| Projection time (minutes): | 10 | 15 to 20 | 15 | 25 |
| Temperature of the support during the projection (°C.): | 100 to 200 | 150 to 250 | 200 to 400 | 100 to 200 |
| Distance between projection nozzle and support (mm): | 150 | 150 | 200 | 150-200 |
| Thickness of the layer formed by heat projection (mm): | 3 | 5-7 | 3 | 3 to 5 |
| Densifying heat treatment of the layer before it is separated from the support | at 1050° C. | Sintering at 900° C. for 2 hours | Sintering with partial fusion, at 1030° C., for 15 minutes | None |
| Final thickness of the layer which is obtained (plunger wall) (mm): | 2.8 | 5.5 | 2.8 | 4 |

It is quite understood that the examples which are given above are only intended to serve as illustration and do not in any way limit the scope of the invention.

I claim:

1. A process for manufacturing a hollow composite moulding plunger for moulding glass objects which comprises:
   providing a cylindrical support element 1 having a substantially conically formed end portion with a rounded peak,
   said support element 1 having a removably fitted solid preform sleeve 2 thereon for use in forming said hollow composite moulding plunger, said sleeve 2 having a reduced coaxially extending annular portion 4, said sleeve 2 being used as a base mounting for said mould plunger,
   said conical end portion of the support being characterized by a releasing surface for enabling the subsequent removal of a plunger flame sprayed thereon,
   flame spraying a releasably adhering layer 3 of plunger-forming material having a wall thickness ranging from about 0.5 mm to 10 mm on said conical end portion,
   the layer of material flame sprayed also covering and forming an adherent bond on said reduced annular extending portion 4 of said removable sleeve,
   and then separating the support element 1 from said flame sprayed layer including the solid sleeve 2 to which said sprayed layer is attached, while maintaining the integrity of the composite moulding plunger comprising said sleeve 2 bonded to said flame sprayed layer 3.

2. Process according to claim 1, characterized in that the layer of plunger-forming material is subjected to a densifying heat treatment prior to being separated from the support element.

3. Process according to claim 2, characterized in that the densifying treatment is thermal sintering.

4. Process according to claim 2, characterized in that the densifying treatment is a sintering during which there is a formation of liquid phase.

5. Process according to claim 2, characterized in that the densifying treatment is a thermal fusing operation.

6. Process according to claim 1, characterized in that the layer of material formed by flame spraying is a metallic alloy.

7. Process according to claim 6, characterized in that the metallic alloy is a self-cleaning alloy.

8. Process according to claim 6, characterized in that the alloy is a nickel-base alloy selected from the group consisting of Ni-Si-B, Ni-Cr-Si-B, and Ni-Cr and a copper alloy.

9. Process according to claim 8, characterized in that the layer of plunger-forming material made by flame spraying is a metallic alloy based on the elements Ni-Cr or based on copper, and in that the removal of the layer from the support is effected without previous densifying heat treatment.

10. Process according to claim 1, characterized in that the layer of plunger-forming material formed by flame spraying is a mixture of at least one metallic material and at least one ceramic material.

11. A process for manufacturing a hollow composite moulding plunger for moulding glass objects which comprises:

providing a cylindrical support element 1 having a substantially conically formed end portion with a rounded peak, said support element 1 having a removably fitted solid preform sleeve 2 thereon for use in forming said hollow composite moulding plunger, said sleeve 2 having a reduced coaxially extending annular portion 4, said sleeve 2 being used as a base mounting for said mould plunger, said conical end portion of the support being characterized by a releasing surface for enabling the subsequent removal of a plunger flame sprayed thereon, flame spraying a releasably adhering layer 3 of plunger-forming material having a wall thickness ranging from about 0.5 mm to 10 mm on said conical end portion, the layer of material flame sprayed also covering said forming an adherent bond on said reduced annular extending portion 4 of said removable sleeve and thereby provide an integrated structure of sleeve 2 with flame sprayed layer 3, and then separating the support element 1 from said flame sprayed layer 3 integral with solid sleeve 2 while maintaining the integrity thereof.

* * * * *